United States Patent
Brown

(10) Patent No.: US 6,330,306 B1
(45) Date of Patent: Dec. 11, 2001

(54) TEST DEVICE FOR TELEPHONE LINES

(75) Inventor: Paul C. Brown, 3514 Edgehill, Grapevine, TX (US) 76051

(73) Assignee: Paul C. Brown, Grapevine, TX (US)

( * ) Notice: Subject to any disclaimer, the term of this patent is extended or adjusted under 35 U.S.C. 154(b) by 0 days.

(21) Appl. No.: 09/379,186

(22) Filed: Aug. 23, 1999

(51) Int. Cl.$^7$ .............................. H04M 1/24; H04M 3/22
(52) U.S. Cl. ..................... 379/21; 379/27.01; 379/1.01
(58) Field of Search ................................. 379/6, 211.01, 379/10.01, 27.01, 27.04, 27.05, 29.03, 29.04, 413, 413.02, 401, 399.01

(56) References Cited

U.S. PATENT DOCUMENTS

| | | | |
|---|---|---|---|
| 4,682,346 | 7/1987 | Faith | 379/22 |
| 4,864,226 | 9/1989 | Tachimoto | 324/157 |
| 4,939,765 | 7/1990 | Benjamin et al. | |
| 5,193,107 | * 3/1993 | Parker et al. | 379/21 |
| 5,228,072 | * 7/1993 | Ingalsbe et al. | 379/21 |
| 5,617,466 | 4/1997 | Walance | |
| 5,956,385 | 9/1999 | Soto | 379/27 |

\* cited by examiner

Primary Examiner—Curtis Kuntz
Assistant Examiner—Rexford N Barnie
(74) Attorney, Agent, or Firm—Haynes and Boone, LLP

(57) ABSTRACT

An in-line data protector for preventing a test set from accessing a telephone line under a predetermined condition is disclosed. The in-line data protector selectively connects the test set and the telephone line responsive to detection of a data signal on the telephone line. The in-line data protector includes a power circuit for providing general operating power, a processor connected to the telephone line, and a relay serially connected between the telephone line and the test set. When general operating power is received, the processor analyzes the telephone line by emulating a single band filter. By using a single band filter, a very good determination can be made as to whether a signal on the telephone line is a data signal or a voice signal. If the signal is not a data signal, the processor instructs the relay to close, thereby connecting the telephone line to the test set.

9 Claims, 4 Drawing Sheets

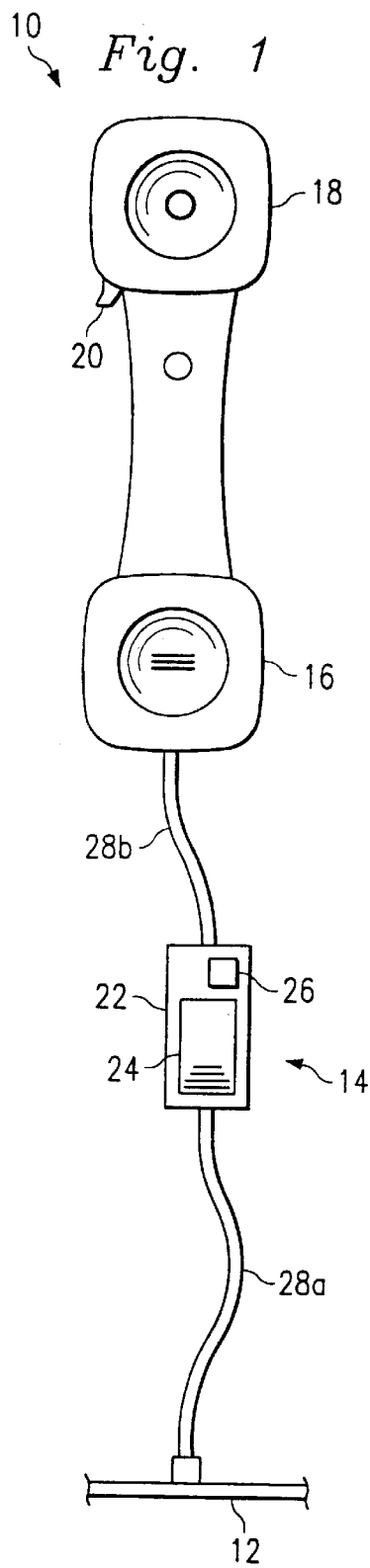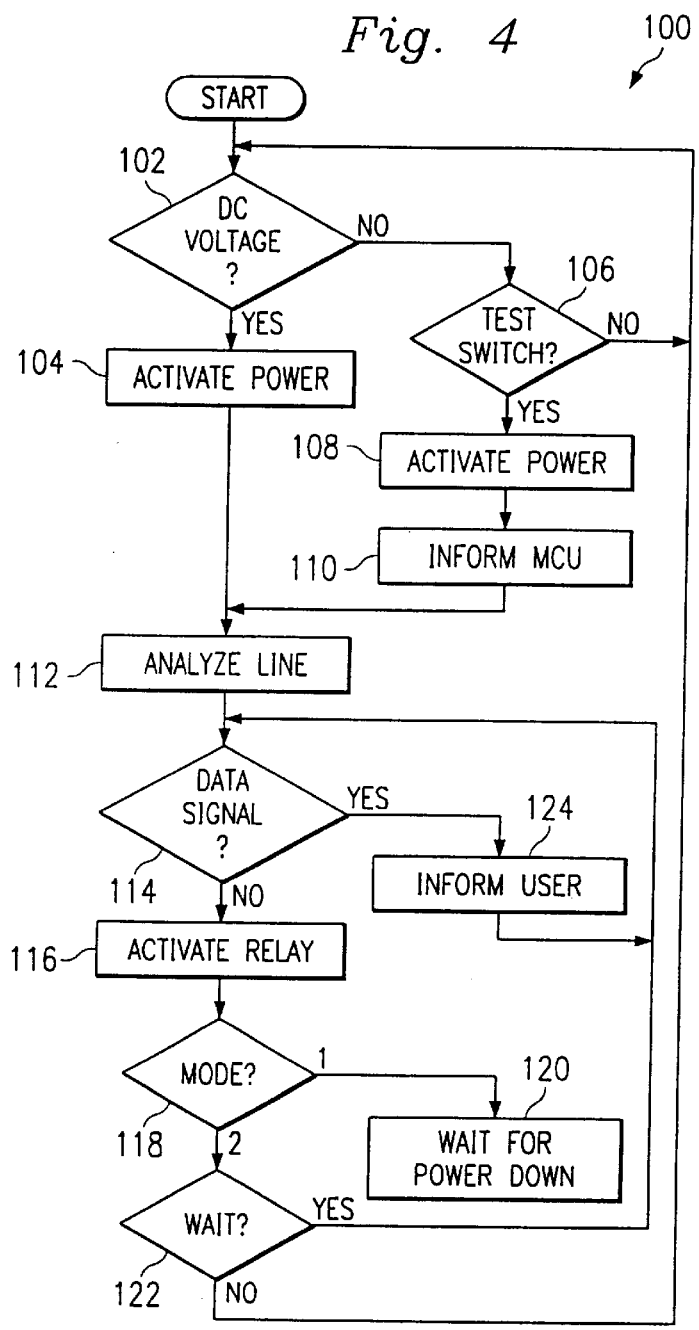

TEST DEVICE FOR TELEPHONE LINES

TECHNICAL FIELD

This invention relates generally to telephone line interface devices, and more particularly, to a method and apparatus for preventing a test set from accessing a telephone line under a predetermined condition.

BACKGROUND

Telecommunications in general is advancing in many different directions. Such advancements can be divided into two categories: digital signals and analog signals. Analog signals provide conventional communication paths between two nodes in a telecommunication network. For example, a conventional home telephone may establish a connection with a central office through a pair of TIP and RING lines (collectively referred to as a telephone line) for the purpose of transmitting analog signals back and forth. The analog signals may include voice and/or analog computer modem traffic.

Digital signals also provide communication paths between two nodes in a telecommunication network. For example, a conventional home computer may establish a connection with a central office through a telephone line for the purpose of transmitting digital signals back and forth. A contemporary example would be a digital subscriber line, or DSL, for establishing a high speed data path between the computer and another node connected (directly or indirectly) to the central office.

Analog signals are defined to a predetermined bandwidth, called a voice band. The voice band typically ranges from a few hundred hertz (Hz) to about 3 kilo Hz (kHz), which coincides with a sound range for a human ear. Any signal carried on a telephone line that is in the voice band is deemed to be an "in-band" signal. Also by definition, analog signals must exceed a predetermined voltage threshold. The voltage threshold represents the amplitude of the signals, measured either in decibels (db) or volts peak-to-peak (Vp-p).

Digital signals are also defined to a predetermined bandwidth, called a data band. The data band typically ranges from 3 kHz to several thousand kHz. Any signal carried on a telephone line that is in the data band is deemed to be an "out-of-band" signal. Also by definition, data signals must exceed a predetermined voltage threshold. The voltage threshold represents the amplitude of the signals, measured either in decibels or volts peak-to-peak.

Telephone lines often require maintenance and repair. During such maintenance, a butt-in test set is often used to detect the presence of an audio signal on the line. Typically, the test set is connected across the TIP and RING lines and placed off-hook, thereby seizing the lines. If the telephone line is carrying an out-of-band digital signal, however, the person using the test set will not hear anything and inappropriately seize the line. As a result, the out-of-band digital signal will be corrupted by the test set. Specifically, the test set will provide an electrical load to the telephone line. After a period of time, this load will adversely affect the data signal, thereby corrupting the data.

Therefore, it is desired to accurately test for an out-of-band digital signal when a telephone line is to be seized. If the out-of-band digital signal is detected, it is further desired to prevent the line from being seized and to indicate such to the user.

It is also desired that the test set work properly with different types of telephone lines. For example, a central office will often supply a direct current (DC) voltage to the telephone line. This DC voltage can supply power to many conventional telephones, and has other conventional uses. However, some telephone lines do not have any applied DC voltage. It is important that a test set work with a telephone line, regardless of its type.

It is further desirable to support sequential automatic connection testing. Although the ideal method for connecting a test set to a telephone line is to first monitor the line with the test set in the on-hook mode, and then switch to the off-hook mode only after assuring that the line is not carrying data signals, it is common practice among telecom users to leave the test set in the off-hook mode and move the test set down a column of different telephone line terminals. This type of testing, called sequential automatic connection testing, can corrupt data signals in many types of telephone lines.

U.S. Pat. No. 5,617,466 describes a mechanism for controllably enabling a test set to assert off-hook condition on a telephone line if a prescribed voltage level is detected and no out-of-band digital signals are detected. However, this patent requires the existence of a DC voltage on the telephone line. Also, this patent does not support sequential automatic connection testing. Specifically, the patented circuit includes a rectifier bridge, similar to the rectifier bridge commonly found in most test sets. The additional voltage drop across the second bridge will degrade the performance of the test set in certain situations.

U.S. Pat. No. 4,939,765 describes an interlock circuit for preventing corruption of digital signals on a telephone line. However, this patent only checks for data during a limited test period. Therefore, this patent requires the existence of a DC voltage on the telephone line to perform sequential automatic connection testing. It will never know when it moves to a new telephone line that does not have a DC voltage present, and will automatically apply a data-corrupting load to the unpowered line.

SUMMARY

In response to the problems and needs described above, provided is an improved method and apparatus for preventing a test set from accessing a telephone line under a predetermined condition. In one embodiment, the apparatus selectively connects the test set and the telephone line responsive to detection of a data signal on the telephone line. The apparatus includes a power circuit for providing general operating power, a processor connected to the telephone line, and a relay serially connected between the telephone line and the test set. When general operating power is received, the processor analyzes the telephone line by emulating a single band filter By using a single band filter, a very good determination can be made as to whether a signal on the telephone line is a data signal or a voice signal. If the signal is not a data signal, the processor instructs the relay to close, thereby connecting the telephone line to the test set.

In some embodiments, the processor includes an audio output connected to the test set. If a data signal is determined to be on the telephone line, an audio output signal can thereby be provided to the test set. If no data signal is determined to be on the telephone line, no audio output signal is provided to the test set, thereby making the existence of the apparatus transparent to the test set.

In some embodiments, an amplifier and Schmitt trigger are connected between the telephone line and the processor for amplifying any signals on the telephone line.

In some embodiments, the power circuit includes a sense circuit to detect if the telephone line includes a DC voltage (is powered). In some embodiments, the power circuit also includes a test circuit, so that if the telephone line is unpowered, a user may manually activate the power circuit. A power hold circuit may also be provided for maintaining the activation of the power circuit for a predetermined period of time (e.g., 12 seconds) after initial user activation.

In some of the embodiments with the test circuit, in response to user activation, the processor can repeatedly analyze the telephone line to determine if a data signal exists.

As a result, several advantages are achieved over the prior art. One advantage is that the apparatus operates as a retrofit to an existing test set, requiring a reduced number of components and a very small package.

Another advantage of the present invention is that with unpowered lines, the apparatus works in a user-activated mode. If no data is detected, connection between the test set and telephone line is established. Furthermore, power-up may be maintained by an internal timer. If the apparatus is removed from the telephone line at anytime during power-up and then connected to another telephone line carrying data, it will quickly disconnect the test equipment and issue an alerting signal to the user.

Another advantage of the present invention is that with powered lines, the apparatus provides data protection that supports sequential connections to multiple telephone lines without unduly loading the telephone line. Furthermore, the apparatus allows the use of accustomed testing practices without the introduction of additional diode drops and their associated long loop performance and measurement accuracy degradations.

BRIEF DESCRIPTION OF THE DRAWINGS

FIG. 1 is an illustration of a test set and an in-line data protector for testing a telephone line.

FIG. 4 is a flow chart illustrating the functionality of the in-line data protector of FIG. 1

DETAILED DESCRIPTION

Figure 2:
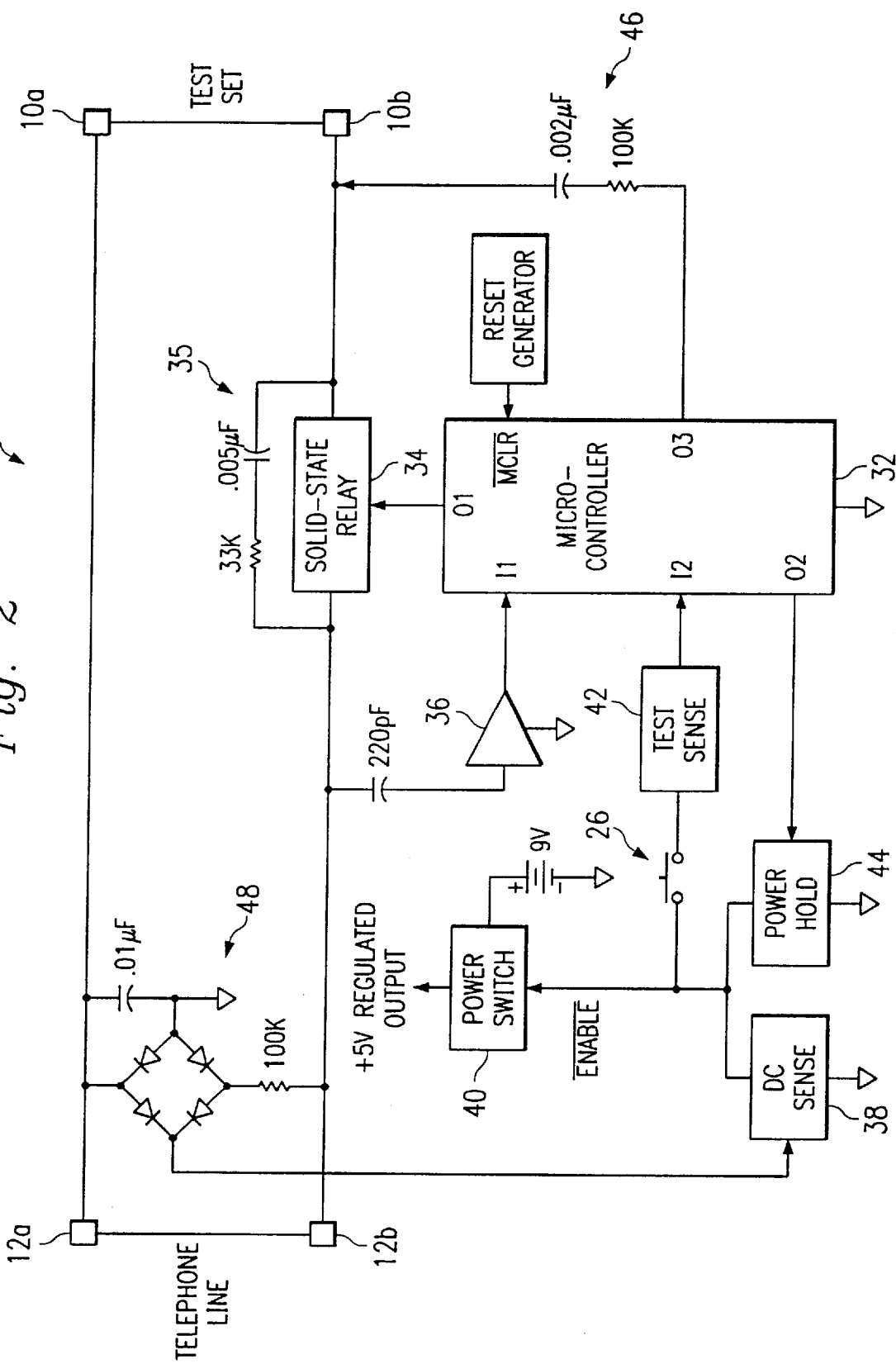
FIG. 2 is a schematic block diagram of one embodiment of the in-line data protector of FIG. 1.

Referring to FIG. 1, a test set 10 is connected to a telephone line 12 through an in-line data protector 14. The in-line data protector 14 accurately tests for an out-of-band digital signal when the telephone line 12 is to be seized by the test set 10. If the out-of-band digital signal is detected, the in-line data protector 14 prevents the line 12 from being seized, and provides an audio indication thereof. It is understood that the following disclosure provides many different embodiments, or examples, for implementing different features of the present invention. Techniques and requirements that are only specific to certain embodiments should not be imported into other embodiments. Also, specific examples of integrated circuits, components, and voltage levels are described below to simplify the present disclosure. These are, of course, merely examples and are not intended to limit the invention from that described in the claims.

The test set 10 is a conventional device, including a mouth piece 16, an ear piece 18, and a switch 20. The switch allows the test set 10 to be selectively placed in either an on-hook or off-hook condition, for selectively opening or closing, respectively, a loop with the TIP and RING lines of the telephone line 12. The test set 10 can operate in a talk mode while being connected (off-hook) with the telephone line 12, or a monitor mode while being disconnected (on-hook) with the telephone line.

The in-line data protector 14 includes a plastic shell 22 having a removable opening 24 for receiving a battery such as a 9 Volt battery. The plastic shell 22 also includes a test switch actuator 26 for selectively activating an electric circuit, discussed in greater detail below. The in-line data protector 14 also includes two intermediate lines 28a and 28b for connecting to the telephone line 12 and the test set 10, respectively. Connections to the telephone line 12 and the test 10 may be any type of conventional connection, such as a wire clip connection or a jack-type connection. For the present disclosure, when the intermediate line 28a and the telephone line 12 are connected, they can be considered as one and the same. Likewise, when the intermediate line 28b and the test set 10 are connected, they too are considered as one and the same.

Figure 3:
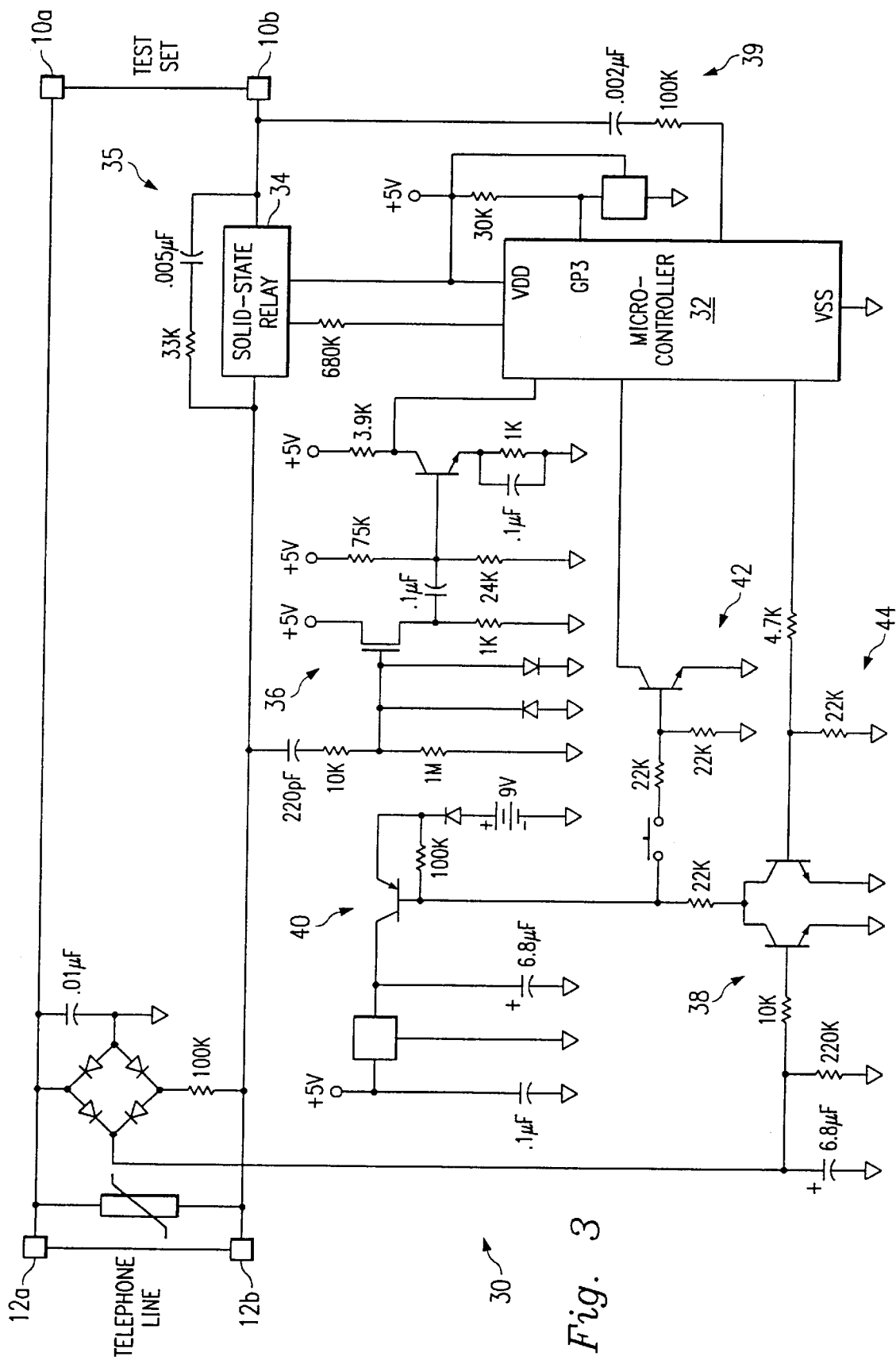
FIG. 3 is a detailed version of the schematic block diagram of FIG. 2.

Referring now to FIG. 2, the in-line data protector 14 of FIG. 1 includes a circuit 30 for implementing specific functions. FIG. 3 provides a schematic realization of one embodiment of the circuit 30. The circuit 30 connects to the TIP and RING lines of the telephone line 12, herein designated as lines 12a and 12b, respectively. The circuit 30 also connects to the TIP and RING lines of the test set 10, herein designated as lines 10a and 10b, respectively. Although not shown, the circuit 30 receives power from the 9 Volt battery discussed above, with respect to FIG. 1.

The circuit 30 includes a microcontroller 32, such as a PICmicro MCU from Microchip Technology. The microcontroller 32 includes an internal timer/counter for improved power and space requirements. Although the following description uses the PICmicro microcontroller, it is understood that many different processors may be used, with appropriate voltage and/or signal modifications. It is further understood that the following description uses discrete components for the sake of clarity, and that alternative solutions may utilize different components, such as one or more application specific devices, to accomplish one or more of the features of the present invention.

The circuit 30 also includes a solid state relay 34 connected to a first output O1 of the microcontroller 32 for selectively connecting one of the TIP and RING lines 12a, 12b to one of the test set lines 10a, 10b, respectively. For the sake of example, the relay 34 selectively connects line 12b to line 10b. The relay 34 includes an R-C bypass circuit 35 so that a small amount of alternating current (AC) signal is fed to the line 10b, without the impedance being high enough to load the telephone line 12b. In one embodiment, the relay 34 is a fast acting component specifically designed for telecom hookswitch applications. It is normally open (disconnected) and when closed, adds only about 30 Ohms of additional loop resistance without any diode voltage drop.

An amplifier 36 connects line 12b to a Schmitt triggered first input I1 of the microcontroller 32. As a result, an amplified version of any data signal or voice signal from the line 12b is provided to the microcontroller 32 for analysis according to the present invention. The combination of the signal amplification and the Schmitt triggering provides certain benefits discussed below.

The telephone line 12 may or may not include a DC voltage. As a result, different power up configurations are provided for the different types of telephone line. If the line 12b includes a DC voltage (the line is powered), it will be detected by a DC sense circuit 38, which will instruct a power switch 40 to activate, thereby enabling the circuit 30. This is referred to as Mode 1 operation, discussed in greater detail below. In Mode 1 operation, the power switch 40 provides regulated voltage to the various components of the circuit 30 as long as the DC sense circuit 38 continues to detect the DC voltage.

Alternatively, if there is no DC voltage on the line 12b, a user can activate the circuit 30 by pressing the test switch actuator 26. This is referred to as Mode 2 operation, also discussed in greater detail below. The pressed test switch actuator 26 will also instruct the power switch 40 to activate, thereby providing regulated voltage to the various components for as long as the test switch actuator is pressed. Furthermore, the test switch actuator 26 connects to a second input I2 of the microcontroller 32 through a test switch circuit 42. The test switch circuit 42 informs the microcontroller 32 that power up was responsive to activation of the test switch actuator 26, and not by the presence of DC voltage on the line 12b.

A second output O2 of the microcontroller is connected to a power hold circuit 44. The power hold circuit 44 activates the power switch 40 in test situations, as described above. In this way, the user can release the test switch actuator 26 and the power hold circuit 44 will continue to activate the power switch 40, under control of the microcontroller 32.

A third output O3 of the microcontroller 32 is connected to the line 10b through an R-C circuit 46. The third output O3 and R-C circuit 46 are used to provide tones to the test set upon detection of a data signal on the line 12b. In one embodiment, the tones are provided to the test set ear piece 18 (FIG. 1), which can only be heard if the test set 10 is in the monitor (on-hook) mode. If the test set 10 is in the talk (off-hook) mode, the user will not hear the alert tone, but the line remains disconnected. The tones are provided only when the data signal is detected and the relay 34 is open. In this way, the in-line data protector 14 is transparent to a user of the test set 10 unless a data signal is present.

Referring also to FIG. 4, the in-line data protector 14 operates in accordance with a method 100 for implementing certain features of the present invention. The method 100 is always running, provided that the power source (the 9V battery) is connected to the circuit. It is understood, however, that various modifications can be made to the method 100 while still implementing the present invention. Certain modifications are discussed in detail, below.

The in-line data protector 14 has three modes of operation. In the first mode of operation (Mode 1), the in-line data protector 14 detects a DC voltage on the line 12b and powers up accordingly. The in-line data protector 14 checks for a data signal on the line 12b and continually remains powered up. In one embodiment, the in-line data protector 14 repeatedly checks for data on the line 12b, while in another embodiment, the in-line data protector only checks for data once. The latter embodiment works well with certain test sets 10 that have keypads that produce harmonic tones that may falsely appear to be data signals. When disconnected from the line 12b, the in-line data protector 14 powers down.

In the second mode of operation (Mode 2), the line 12b does not have a DC voltage associated therewith. In this mode, the in-line data protector 14 powers up responsive to the user pressing the test switch actuator 26. Operation is similar to that of Mode 1, but after a predetermined period of inactivity (e.g., 12 seconds), the in-line data protector 14 powers itself down.

In the third mode of operation (Mode 3), the line 12b also does not have a DC voltage. In this mode, the in-line data protector 14 allows the test set 10 to be used to detect a tracing tone for line identification. The in-line data protector 14 remains unpowered in this mode, but passes a portion of the tracing tone signal through to the test set through the R-C circuit 35. The tracing tone is provided through the R-C circuit 35, which maintains the high impedance of the test set 10 while allowing the tone signal to pass, regardless of the test set.

The method 100 begins at step 102, where the DC sense circuit 38 detects if any DC voltage appears on the line 12b. A DC voltage only appears on some telephone lines, and it is desired that the present invention accommodate different types of telephone lines. It is further understood that no DC voltage will be detected until a user connects the in-line data protector 14 to the telephone line 12. If a DC voltage is sensed, then at step 104, Mode 1 is initiated. The power switch 40 is activated by the DC sense circuit 38, power is provided to the entire circuit 30, and the microcontroller 32 resets for operation.

If at step 102 no DC voltage was detected, the in-line data protector 14 can also be activated by a user pressing the test switch actuator 26. At step 106, if the test switch actuator 26 is pressed, Mode 2 is initiated. The pressed test switch actuator 26 will activate the power switch 40 thereby providing power to the entire circuit 30 and to the microcontroller 32. At step 110, the pressed test switch actuator 26 also informs the microcontroller 32 through input I2 that the test switch was pressed. When the test switch actuator 26 is release by the user, the microcontroller 32 maintains power through the power hold circuit 44 attached to the second output O2.

If at step 106 the test switch is not pressed, execution returns to step 102. This indicates an idle condition when the in-line data protector 14 is not powered up. It also may indicate Mode 3 operation, where there is no DC voltage on the line 12b, the test switch actuator 26 is not pressed, but a portion of a signal from line 12b passes through the R-C circuit 35 and to the line 10b.

At step 112, the microcontroller 32 receives an amplified signal from the line 12b through the op amp 36. The microcontroller 32 analyzes the amplified signal by emulating a single band filter. The microcontroller 32 provides the capability for single band frequency detection (instead of a multiple band frequency detector as used in the prior art) by measuring the number of cycles over a period of time and comparing the number to the frequency cutoff between the voice band and the data band (about 3 KHz).

Figure 5:
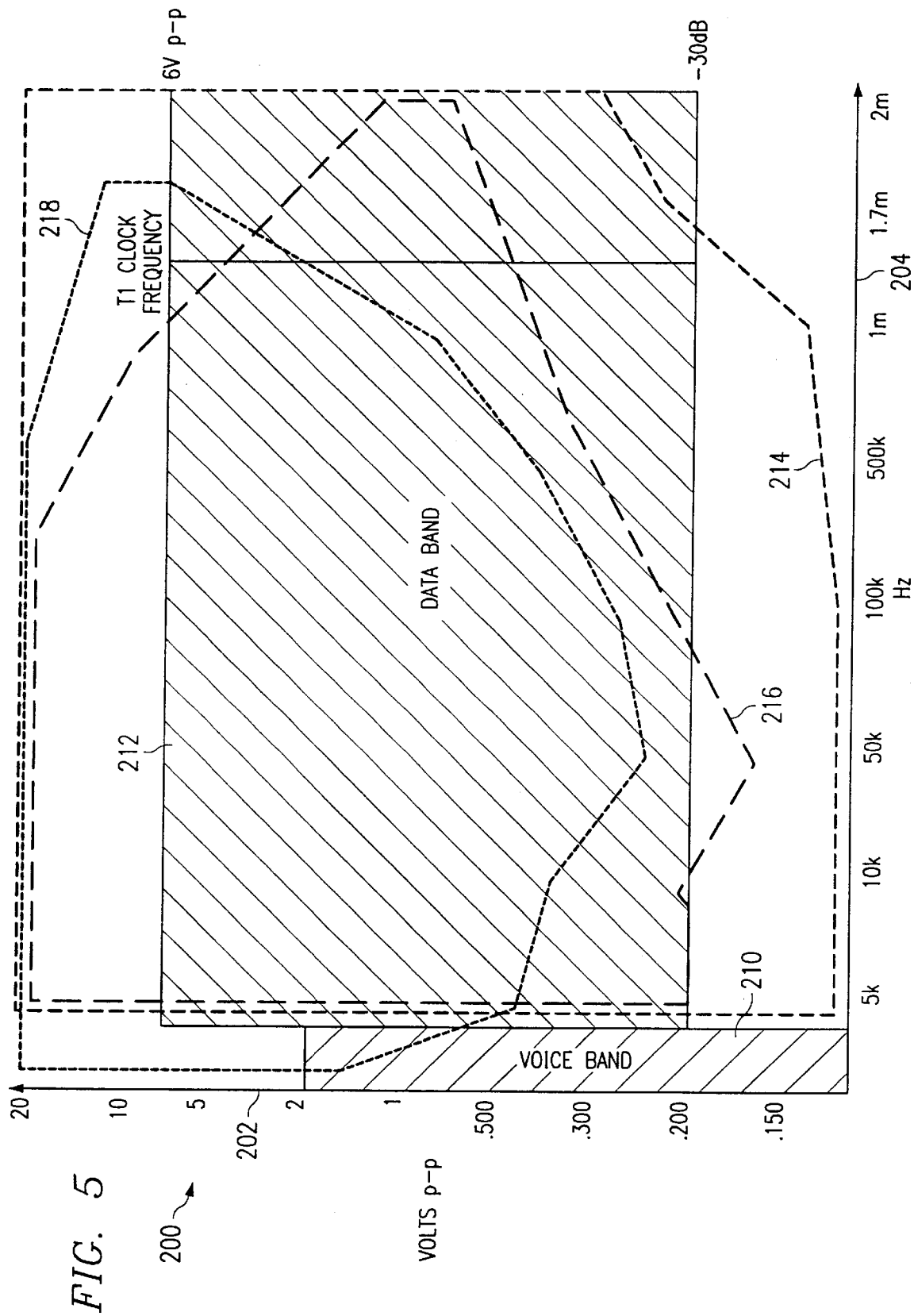
FIG. 5 is a graph illustrating the performance of the in-line data protector of FIG. 1, as compared to the performance of other devices.

Referring now to FIG. 5, the operation of the microcontroller 32 is illustrated on a graph 200. A vertical axis 202 of the graph 200 designates peak-to-peak voltage of a signal (voice or data) on the line 12b and a horizontal axis 204 represents the frequency of the signal. A first region 210 designates a voice band, i.e., a range of possible voltages and frequencies for voice signals. The voice band 210 resides between about 30 Hz to about 3 kHz on the horizontal axis 204 and may include a wide range of voltage Vp-p on the vertical axis 202. A second region 212 designates a data band, i.e., a range of possible voltages and frequencies for data signals. The data band 212 includes, for example, a T1 frequency of about 1.5 MHZ.

A first test area 214 illustrates the operation of the microcontroller 32 according to one embodiment of the present invention. By emulating a single band filter, the microcontroller 32 can detect a significant portion of the data band 212, without detecting any portion of the voice band 210. In comparison, a second test area 216 and a third test area 218 illustrate the operation of conventional units, such as those described in U.S. Pat. Nos. 4,939,765 and 5,617,466. It is noted that both of these patents teach multi-band pass filters to detect signals in the data band 212. However, as can be clearly seen from the graph 200, neither of these test areas 216, 218 provide adequate coverage of the data band 212. Furthermore, the test area 218 also overlaps the voice band 210 and therefore is likely to produce false data signal readings.

Referring again to FIG. 4, upon completion of step 112, execution proceeds to step 114 where a determination is made if the signal from line 12b is a data signal. If not, then at step 116 the relay 34 (which is open by default) is closed, thereby connecting the line 12b to the line 10b and closing the loop.

At step 118, a determination is made as to which mode (Mode 1 or Mode 2) is being implemented. If Mode 1 is being implemented, execution proceeds to step 120 where the microcontroller 32 waits to be power down. If Mode 2 is being implemented, execution proceeds to step 122, where the microcontroller 32 waits a predetermined period of time (e.g., 12 seconds) after the test switch actuator 26 is pressed and no data has been detected. While it is waiting, it returns to step 114 and repeatedly checks for a data signal. After the predetermined period of time has elapsed, the in-line data protector 32 will power down and execution will return to step 102. The user can press the test button at any time during the predetermined time period for an additional 12 seconds.

If at step 114 a data signal is detected, execution then proceeds to step 124 and the relay is not activated. The user is informed that data is detected and no connection is made between lines 12b and 10b. Execution then returns to step 112 where the microcontroller 32 continues to analyze the amplified signal. A power down of the circuit 30 will, of course, terminate operation of the method 100.

An advantage of the present invention is that it operates as a retrofit to an existing test set, requiring a reduced number of components and a very small package.

Another advantage of the present invention is that with unpowered lines, the present invention assumes Mode 2 operation. In this mode, power-up and data test are initiated by pressing the test switch actuator 26. If no data is detected, connection of the test set 10 to the line 12 is established.

Furthermore, in Mode 2 operation, power-up is maintained by an internal timer, which allows a specific amount (12 seconds) of operation at a time. Unlike the prior art, in Mode 2 operation, the in-line data protector 32 tests for data continuously. If the in-line data protector input is removed from the line 12b at anytime during power-up and then connected to another line carrying data, it will disconnect the test equipment from the line in less than 10 milliseconds and issue an alerting signal to the user. Should the power-up timer expire before connection to another line, the test switch actuator 26 must be pressed again to initiate another test operation.

Another advantage of the present invention is that with powered lines, the present invention assumes Mode 1 operation. This supports sequential automatic connection testing because the in-line data protector 14 powers-up automatically when a DC voltage is detected and powers-down automatically when the DC voltage is removed. The DC voltage is sensed at the line 12b without introducing an additional rectifier bridge into the phone line loop. Furthermore, the in-line data protector 14 allows the use of accustomed testing practices without the introduction of additional diode drops and their associated long loop performance and measurement accuracy degradations.

Although illustrative embodiments of the invention have been shown and described, other modifications, changes, and substitutions are intended in the foregoing disclosure. Also, different considerations may require different circuit components and arrangements. Accordingly, it is appropriate that the appended claims be construed broadly and in a manner consistent with the scope of the disclosure.

What is claimed is:

1. An apparatus selectively connectable between a test set and a telephone line for preventing operation of the test set upon detection of a data signal on the telephone line, the apparatus comprising:

a power circuit for providing power to the apparatus;

a processor connected to the telephone line for analyzing the telephone line responsive to power being provided;

a relay serially connected between the telephone line and the test set for selectively connecting the test set to the telephone line responsive to a command from the processor; and an amplifier for connecting the telephone line to a Schmitt trigger input of the processor;

wherein the processor emulates a single band filter for determining if a signal on the telephone line is a data signal or a voice signal, and wherein the processor provides the command if no data signal is determined to be on the telephone line.

2. The apparatus of claim 1 further comprising:

an audio output connected to the processor and to the test set so that if a data signal is determined to be on the telephone line, an audio output signal is provided to the test set, and if no data signal is determined to be on the telephone line, no audio output signal is provided to the test set, thereby making the existence of the apparatus transparent to the test set.

3. The apparatus of claim 1 wherein the power circuit includes a test circuit, so that if the telephone line is unpowered, a user may activate the power circuit.

4. The apparatus of claim 3 wherein, in response to user activation, the processor repeatedly analyzes the telephone line to determine if a data signal exists.

5. The apparatus of claim 3 further comprising:

a power hold circuit for maintaining the activation of the power circuit for a predetermined period of time after initial user activation.

6. An in-line data protector comprising:

a first terminal input pair for connecting to a telephone line pair;

a second terminal input pair for connecting to two lines of a butt-in test set;

a solid-state relay connected between a first line of the telephone line pair and a first line of the butt-in test set;

a connector connecting a second line of the telephone pair to a second line of the butt-in test set;

a resistor-capacitor bypass circuit for bypassing the solid state relay, thereby passing a portion of any signal on the first line of the telephone line pair to the first line of the butt-in test set;

an amplifier having an input connected to the first line of the telephone line pair;

a power supply for providing a regulated voltage to the in-line data protector;

a direct current (DC) sense circuit connected across the telephone line pair for detecting if a DC voltage exists on the telephone line pair and for activating the power supply on detection of the DC voltage;

a test switch circuit for activating the power supply in response to a user action;

a microcontroller having a first Schmitt triggered input connected to an output of the amplifier, a second input connected to the test switch circuit, a first output for controlling the solid state relay, a second output for activating a circuit for maintaining power supply activation for a predetermined period of time after user activation, and a third output connected to the first line of the butt-in test set.

7. The in-line data protector of claim 6 wherein the microcontroller emulates a single band filter for determining if a signal on the first line of the telephone line pair is a data signal or a voice signal, and wherein the microcontroller activates the relay if no data signal is determined to be on the first line of the telephone line pair.

8. The in-line data protector of claim 6 wherein the microcontroller does not drive an audio output signal on the third output unless a data signal is determined to be on the first line of the telephone line pair.

9. The in-line data protector of claim 6 wherein, if the power supply is activated by the test switch, the microcontroller repeatedly analyzes the telephone line to determine if a data signal exists.

* * * * *